June 13, 1933.                C. J. McKENNA                1,913,606
                                BATTERY TOOL
                             Filed June 30, 1932
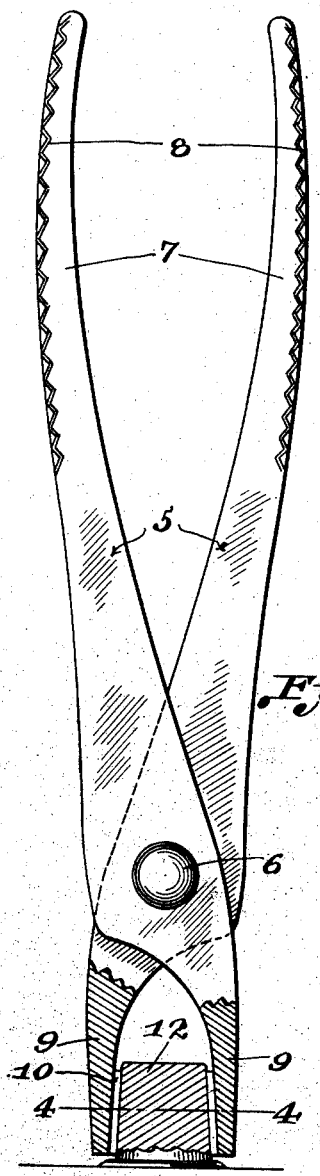
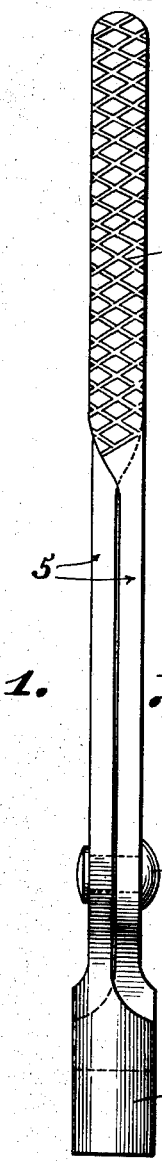
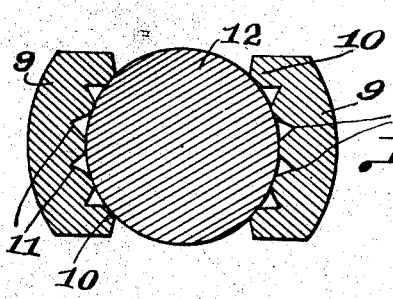
Inventor
C. J. McKenna
By Seymour & Bright
Attorneys Patented June 13, 1933

1,913,606

UNITED STATES PATENT OFFICE

CHARLES J. McKENNA, OF NEWARK, NEW JERSEY, ASSIGNOR TO ATLAS SUPPLY COMPANY, OF NEWARK, NEW JERSEY, A CORPORATION OF DELAWARE

BATTERY TOOL

Application filed June 30, 1932. Serial No. 620,242.

This invention relates to battery tools, and more especially to combined pliers and battery post reamers.

It is well known that due to corrosion and the like, the posts of wet batteries are covered with a coating, owing to the working of the electrolyte, and such coating and the acid contained therein not alone tends to gradually destroy the post, but to also destroy a cable terminal used with the same. Various improvised implements are employed to remove such corrosive coatings.

It is also known that batteries on automobiles are often in inaccessible places, and pliers are sometimes used to grasp a battery post for the purpose of removing the battery from its casing.

The primary object of the present invention is to provide a tool not alone useful as pliers, but also especially adapted for cleaning or reaming battery posts.

With the foregoing object outlined and with other objects in view which will appear as the description proceeds, the invention consists in the novel features hereinafter described in detail, illustrated in the accompanying drawing, and more particularly pointed out in the appended claims.

In the drawing,

Fig. 1 is a side elevation partly in vertical section of the improved tool, and showing the same engaging a battery post.

Fig. 2 is an edge elevation of the tool.

Fig. 3 is an edge elevation of one of the levers of the tool, viewed from the inner side thereof.

Fig. 4 is an enlarged sectional view of a detail taken on the line 4—4 of Fig. 1.

As shown in the drawing, the tool comprises a pair of crossed levers 5 which are pivotally connected together by a pin 6. The outer end portions of these levers form handles 7 that are exteriorly roughened or milled, as shown at 8, to prevent the operator's hands from slipping.

The lower end of each lever is of arc-shape, as shown at 9, and the arcs of the opposite levers have a common center or axis.

Teeth 10 which extend lengthwise of each lever, are preferably formed by cutting V-shaped grooves 11 side by side in the inner face of each portion 9 of a lever, and the edges of the teeth thus formed coincide with an arc-shaped line. Consequently, when the jaws 9 are gripping a battery post 12, and the tool is rotated about the axis of said post, the corrosive coating will be readily cut from the post, and the outer surface of the latter can be expeditiously cleaned, so that it will make a good contact with a cable terminal when the latter is attached to the post.

By making the outer ends of the teeth of substantially arc-shape, it will be understood that the teeth in rotating on the post, will quickly remove the corrosive coating without cutting away too much of the post, as would be the case if the teeth had V-shaped or sharp edges. Furthermore, as the edges of the teeth are relatively blunt, it will be understood that when the tool is employed to lift a battery, the teeth will not tend to bite into the post and mutilate the latter.

From the foregoing it is believed that the advantages and construction of my invention may be readily understood, and it is apparent that changes may be made in the details disclosed, without departing from the spirit of the invention, as expressed in the claims.

What is claimed and desired to be secured by Letters Patent is:

1. Combined pliers and battery post reamers, comprising pivotally connected levers having handle portions at one end and battery post gripping portions at the opposite end, each of the last mentioned portions having a substantially arc-shaped toothed inner surface, the arc being drawn from an axis extending in the general lengthwise direction of said levers, each tooth having a blunt edge arranged lengthwise of the lever with which it is associated.

2. A battery tool comprising crossed pivotally connected levers, each lever provided with a hand engaging portion and a jaw, each jaw being provided with a substantially arc-shaped series of teeth extending lengthwise of the lever.

3. A battery tool comprising crossed pivotally connected levers, each lever provided with a hand engaging portion and a jaw, each jaw being provided with a substantially arc-shaped series of teeth extending lengthwise of the lever, said teeth having blunt edges.

4. A battery tool comprising crossed pivotally connected levers, each lever provided with a hand engaging portion and a jaw, each jaw being provided with teeth extending lengthwise of the lever, the teeth of the opposite jaws having substantially arc-shaped edges drawn from a common center.

5. A battery tool comprising crossed pivotally connected levers, each lever including a hand engaging portion and a jaw, each of said jaws being provided at its inner side with spaced V-shaped grooves extending lengthwise of the lever with which they are associated, and forming teeth between the grooves, the edges of said teeth being relatively blunt and being in an arc-shaped line.

In testimony whereof, I have signed this specification.

CHARLES J. McKENNA.